United States Patent
Aoyama

(10) Patent No.: US 7,405,755 B2
(45) Date of Patent: Jul. 29, 2008

(54) FRAME GRABBER

(75) Inventor: Chiaki Aoyama, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 679 days.

(21) Appl. No.: 10/947,363

(22) Filed: Sep. 23, 2004

(65) Prior Publication Data

US 2005/0093990 A1  May 5, 2005

(30) Foreign Application Priority Data

Nov. 5, 2003 (JP) ............................. 2003-376257

(51) Int. Cl.
*H04N 5/235* (2006.01)
(52) U.S. Cl. ................................. 348/231.99
(58) Field of Classification Search ............. 348/231.99
See application file for complete search history.

(56) References Cited

U.S. PATENT DOCUMENTS

| | | | | |
|---|---|---|---|---|
| 5,579,060 A | * | 11/1996 | Elberbaum | 348/705 |
| 5,617,076 A | * | 4/1997 | Stern | 340/583 |
| 6,791,602 B1 | * | 9/2004 | Sasaki et al. | 348/159 |
| 6,947,069 B1 | * | 9/2005 | Elberbaum | 348/50 |
| 7,075,565 B1 | * | 7/2006 | Raymond et al. | 348/126 |
| 2004/0201672 A1 | * | 10/2004 | Varadarajan et al. | 348/148 |

FOREIGN PATENT DOCUMENTS

GB        2355612 A   *   4/2001

OTHER PUBLICATIONS

Japanese Examined Patent Application Publication JP, 3088508, B (in Japanese and in English).

* cited by examiner

*Primary Examiner*—James M Hannett
(74) *Attorney, Agent, or Firm*—Squire, Sanders & Dempsey, L.L.P.

(57) ABSTRACT

A frame grabber comprising image signal decoders to convert the analog image signal to digital image data, a multiplexer to select the image data stream sent from the image signal decoders, frame memories and a memory controller to control the digital image data in a unit of frame data to be transferred to an external main image processor unit further has a pulse generator, a pulse counter, a bus controller for transferring the frame data and a time stamping code generator to consolidate the same time base between the in-frame image data and other data used for robot controlling.

4 Claims, 8 Drawing Sheets

When Last Raster of Final Frame Region is within
Last Raster Line of Transferred Frame Data When Last Raster of Final Frame Region is equal to or larger than
(the image to be processed by the main image processor may exist out
of the final frame region) Last Raster Line of Transferred Frame Data Conventional Frame Grabber Operation

- Final Frame Region
- Frame Data Transfer continuing until end of Whole One Frame:

Present Invention

- Final Frame Region
- Terminating Frame Data Transfer at up to Last Raster Data specified or given before

FRAME GRABBER

FIELD OF THE INVENTION

The present invention relates to a frame grabber that takes substantially time-varying images taken by video cameras and converts them into signals that image data processors can handle.

DESCRIPTION OF THE RELATED ART

An image processing technology called a frame grabber, that is to convert the analog or digital image taken by plural video cameras into digital image data and output them to digital image processors, is well know.

The conventional frame grabber technologies have the following features as (1) to (4) regarding synchronous operation and asynchronous operation;

(1) a frame grabber can take an image in a frame in synchronous to external signals which are generated by a processor other than a main image processor that receives such framed image from the frame grabber wherein the synchronization is carried out in accordance with the bus clock signal, (2) a frame grabber has a capability to react to the interruption raised by an main image processor that receives the framed image wherein the frame grabber raises a flag for sending every framed image after every frame compilation, (3) the conventional frame grabber uses an FIFO or a dual buffer memory to transfer the image data in a sequence order or in a unit of frame data stored by means of DMA after storing the image data thereof. Alternative dual frame memory is a popular technology for DMA data transferring (for example, as described in the reference 1), (4) an image acquisition synchronous signal generated by a frame grabber is used for controlling the lighting apparatus or the environmental illumination so that the reflected lights on the specific objects are specified against the acquired image so that the post processing of the image data is facilitated.

Reference 1:

Paragraphs 0021 to 0025 and FIG. 2, Japanese Examined Patent Application Publication, JP, 3088508, B However, the conventional frame grabber has the following technical problems for each feature as described above.

For (1), if the acquired images by the frame grabber are used with the other data which are handled by a different processor which is not connected to the bus line between the frame grabber and the main image processor that processes the image taken by the frame grabber, then additional synchronization means between the frame grabber and the different processor is required.

For (2), the real-time data handling of the image data in a frame grabber accepts the interruption of image data acquisition after a whole framed image is acquired and not during the frame image acquiring. Therefore, the main image processor has to wait until the completion of image acquisition before interrupting the image acquisition.

For (3), when the main image processor cannot obtain the frame data due to a trouble of DMA transferring, a part of frame data is not acquired and missing some of the sequential frame data so that a complete set of the frame data is difficult to be transferred to the main image processor for post processing.

For (4), the on-off control of the light or illumination to the objective cannot provide sufficient conditions to take the image of the objects in terms of contrast and the extraction of the reflection from the objects for the purpose of post process of the images.

All these problems are substantially caused from the fundamental design concept of frame grabbers, that is, real-time capability to fully support the high priority of image acquisition, slave operation for the master controller and asynchronous operation to support the real-time operation and independent operation for image acquisition. This design concept allows the versatile usage or application of the frame grabbers, but is not sufficient for specific application such as; parallel synchronization to the frame grabber necessary for additional processing to the master controller, wide processing window time but small acquired image frames required, more reliable image data transferring required than toggle buffer memories used for the DMA and simultaneous acquisition of multi-conditional images required. The conventional frame grabber technology and products have not satisfied these requirements which are necessary for complex image-based operation and high system performances.

BRIEF SUMMARY OF THE INVENTION

The present invention provides a new frame grabber that supports the application necessary for complex image-based operation and high system performances.

The present invention provides a synchronization means by which the parallel operation to the master controller and the acquired image taken by the frame grabber is feasible. For this purpose, additional counter is equipped to the frame grabber and used for a synchronous signal for the relevant subsystems.

The present invention provides an interruption of image acquisition done by the frame grabber so that the dead time for the master controller which works for the main image processing can be shortened in terms of short image acquisition time (but the wide time-window for main image processing) and reduced processing time amount for the necessary size of image frames. Therefore load against the main image processor can be lessened.

The present invention provides the reliable image data transferring from the frame grabber to the main image processor by using a ring memory which has larger memory size than the conventional toggle buffer memory. Such memory size realizes frame holding capability that specifies the particular frames to be hold, which enhances adaptation to post image treatment.

The present invention provides multiple conditional image acquisition in one operation so that the optimization of the acquired image is feasible. For this image acquisition is realized with the light or illumination condition synchronous to the counter described above.

DETAILED DESCRIPTION OF THE INVENTION

The embodiments of the present invention are explained by using the figures.

(Construction of Frame Grabber System)

Figure 1:
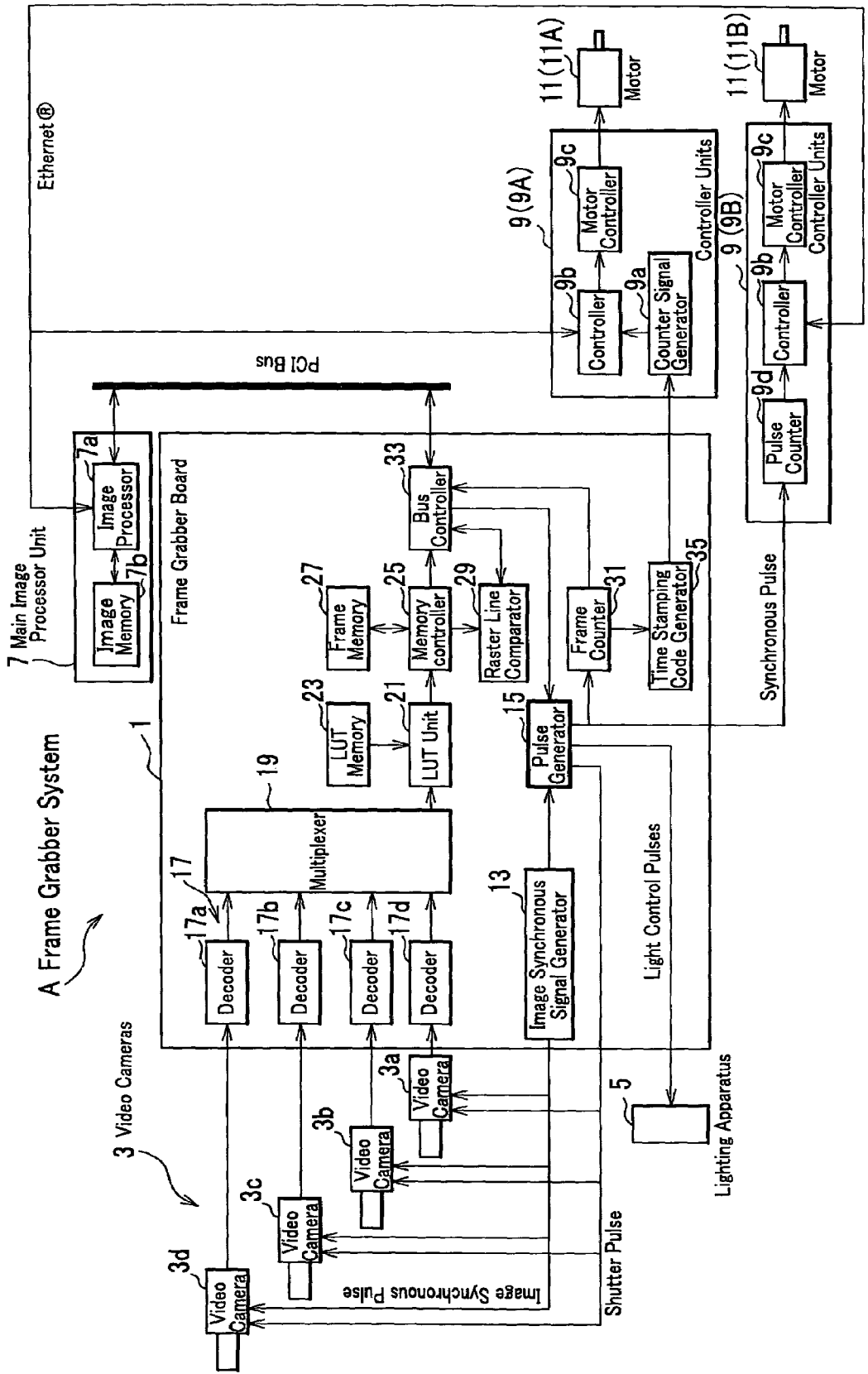
FIG. 1 is a system block diagram that shows the frame grabber regarding to the embodiment of the present invention.

The FIG. 1 shows the block diagram of the frame grabber system including a frame grabber board, a main image processor and controllers used for a walking robot. Specifically, the frame grabber system A comprises the frame grabber board 1, video cameras 3, a lighting apparatus 5, a main image processor unit 7 and controller units 9 (9A and 9B).

This frame grabber system A is installed in, for example, a walking robot (not shown in details). The lighting apparatus 5 can be adjustable in the intensity of the shining light. The walking robot takes raw images of the objects (for example, obstacles) which are in the fore position of his advancing direction by means of cameras 3. The frame grabber board 1 converts the raw images into digital images in a manner of frames which are transferred to the main image processor unit and outputs a series of synchronous signals (synchronous pulses) to the controller units 9 which control driving apparatuses (for example, motors) to drive the head, the legs, the arms etc.

The other portions relevant to the present invention are explained before the details of the frame grabber board 1 are discussed.

The video cameras 3 are divided into two sets of stereoscopic cameras as a pair of the camera 3a and 3b and the other pair of the camera 3c and 3d. Each video camera alternatively takes the image of the objects in accordance with the image synchronous signal and the release pulse which are output from the frame grabber board 1 and output the image to the frame grabber board 1.

An image synchronous pulse, which is the elementary synchronous pulse for the image acquisition by the frame grabber board 1, works as vertical scanning synchronous pulse for simultaneous raster scanning in all video cameras 3a to 3d. Therefore the image synchronous signal can be regarded as the time resolution to determine the end of the frames of the acquired images.

The shutter pulse is an electronic release that has a function to receive the incidental light to the image devices such as CCDs built in the video cameras 3 for the designated time duration as release time and shut off the incidental light after the release time. The release time is triggered in synchronous to the image synchronous pulse to control the release time of all of the electronic release used for the video cameras 3a to 3d.

The lighting apparatus 5 is given by intense light sources such as a halogen lamp to shine on the objects. The light intensity and the on-time duration are controlled by the light control pulses. The lamp is turned-on and turned-off by the light control pulses. The shining-on pattern to shine the objects by the lighting apparatus 5 is stored in a pattern data storage in a fashion of a digital pattern data.

The main image processor unit 7 is to process the digital image output from the frame grabber 1 and constructed with an image processor 7a and image memories 7b.

The image processor 7a manages the overall control of the main image processor unit 7 and processes the in-frame image of each frame which is an element of the stream image taken by the frame grabber 1. The image process done by the image processor 7a is, for example, to extract the specific objects in the in-frame images, to range the distance to the objects or to specify the objects. The image processor 7a sends various control signals to the frame grabber 1 in order to harmonize the image process functions. For example, the control signals include the one-shot request signal to obtain each composite scanning line that composes a frame in total.

The image memory 7b is assigned into frame memory to support the various image processing capability. Therefore it has a large memory size of which memory capacity is more than that of the memory used in the frame grabber. The image memory 7b has a capability to stores the image frame in an order of input provided by the image processor 7a.

The main image processor unit 7 and the frame grabber is connected by a PCI bus (Peripheral Components Interconnection bus) since PCI bus is commonly used for and supported by image processors and frame grabbers. The main image processor unit 7 and controller units 9A and 9B are linked through an Ethernet® since the main image processor unit 7 and the controller units 9A and 9B are highly independent function units to work for the specific tasks. The ports of the main image processor unit 7 and the controller units 9A and 9B are equipped with the communication modules (not shown in FIG. 1) to support Ethernet communication. The Ethernet is managed with a router (not shown in FIG. 1) as well.

The controller unit 9A controls the motor 11A which drives the robot movable portions and consists of a counter signal generator 9a, a controller 9b and a motor controller 9c.

The counter signal generator 9a generates the pulse count of the synchronous pluses decoded from the time stamping codes output from the frame grabber 1 wherein the pulse count number coincides with that of the pulse counter (the details will be described later) built in the frame grabber 1.

The controller 9b is assigned to manage control function of the controller 9 computes the drive data using the count values output from the counter signal generator 9a and the directive data and the control information which are generated by a robot central controller (not shown in FIG. 1) and are sent through the Ethernet connected thereto. The drive data is sent to the motor controller 9c.

The motor controller 9c controls the motor on the basis of the drive data computed by the controller 9b. For example, the motor is assigned to the head motion of a walking robot (which is not shown in FIG. 1) and the motor controller 9c controls rotation of the motor which results in the head rotation, nodding or head shaking.

The controller unit 9B is to control the motor 11B to drive movable portions of a walking robot (not shown in FIG. 1) and is equipped with a pulse counter 9d, controller 9b and the motor controller 9c. The elements which are same as those for the control unit 9A are omitted for explanation but shown in the similar codes.

The pulse counter 9d is to count the synchronous pulse output from the pulse generator installed in the frame grabber 1 and to output the count number to the controller 9b.

(Construction of Frame Grabber)

The frame grabber acquires the image taken by the camera 2, converts the analog images into the digital images, temporally stores and sends the digital images to the main image processor, generates image synchronous pulse and pulse signal corresponding to the shutter pulses and transfers the count values to controller units 9A and 9B. The frame grabber 1 consists of an image synchronous signal generator 13, the pulse generator 15, decoder 17 (17a, 17b, 17c and 17d), multiplexer 19, LUT converter 21, an LUT memory 23, a memory controller 25 and frame memories 27, a line comparator 29, a frame counter 31, a bus controller (image data) 33, and an time stamping code generator (a synchronous signal) 35.

The image synchronous signal generator 13 generates a series of the image synchronous signal with a constant time repetition by which all video cameras 3a to 3d are simultaneously (all at once) in operation to acquire the images of objects. The image synchronous pulse is a vertical synchronous signal that keeps the synchronization of the initial vertical sweep time. The repletion rate of the image synchronous signal is generally about 1/60 seconds that implies 60 Hz.

The image synchronous signal is used for the vertical synchronous signal, but the image synchronous signal generator 13 can generate the image synchronous signal without color burst and the horizontal synchronous signals. The reason why the color bust signal is not used for the present invention is that there are quite few cameras that can operate in synchronous to the color burst signal and the decoders are not necessary to be synchronous to the analog image signal taken by the video cameras 3a to 3d and no A/D converters are necessary for the decoders 17a to 17d.

In accordance to the image synchronous signal generated by the image synchronous signal generator 13, the pulse generator 15 generates pulse signal trains which are the trigger pulses sourced for the shutter pulses, the light control pulses and the synchronous pulses. More specifically, the shutter pulses are sent to the video cameras 3, the light control pulses to the lighting apparatus 5 and the synchronous pulses to the control units 9B and the frame counter 31.

The pulse generator 15 generates light control pulses which are several kinds of pulse trains for controlling the intensity of the lighting apparatus 5. The pulse trains are called pattern data and the pulse generator 15 has a pattern data memory means which is not schematically shown. The pattern data memory means stores the plural pattern data for variations as the time delay of the pulse heading time against the image synchronous pulses generated by the image synchronous generator 13. The other variations are for pulse duration time and pulse height that indicates the light intensity. The variations are made beforehand to keep the options to select the optimum light conditions as described later.

Figure 2A:
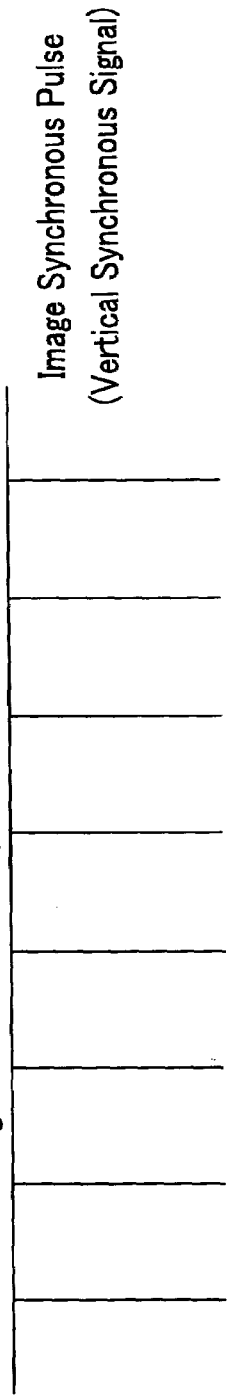
FIG. 2 is a schematic that shows an example of pattern data.
Figure 2B:
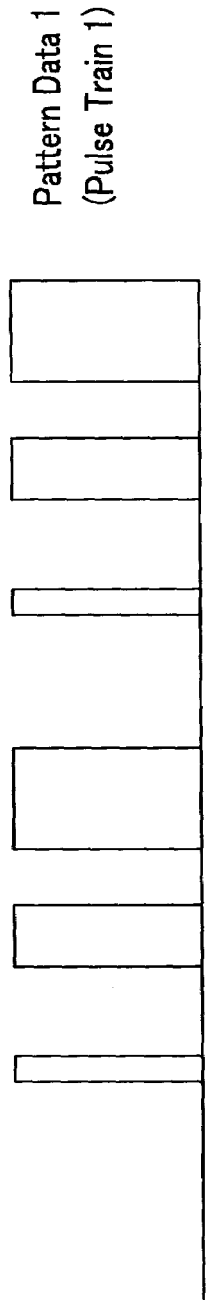
Figure 2C:
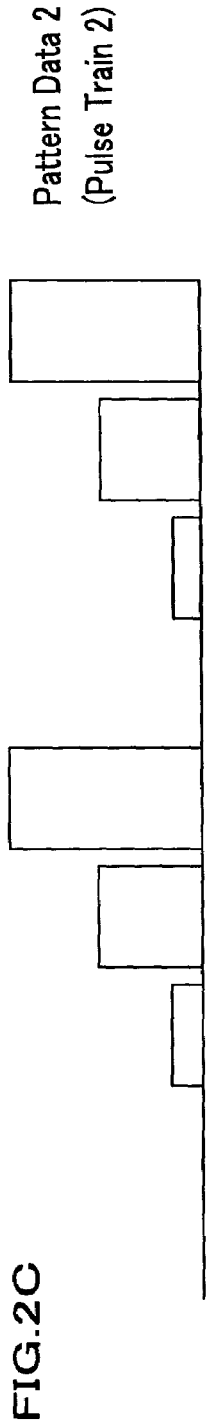

FIG. 2 shows an example of the pattern data which are provided in analog pulses. The image synchronous pulse is generated by the image synchronous signal generator 13 which is a trigger pulse generator for vertical synchronization as shown in FIG. 2A. The pattern data 1 (a pulse train 1), as shown in FIG. 2B, which include the information of the pulse duration proportional to the light shining time to shine on the objects is generated by the image synchronous signal generator 15. The pattern data 2 (a pulse train 2), as shown in FIG. 2C, which include the information of the pulse height proportional to the intensity of the lighting apparatus 5 to shine on the objects is generated by the image synchronous signal generator 15 as well.

The pattern data 1 are a mode of light control pulses which imply the constant light intensity and three different shine-on times. The pattern data 2 is another mode of light control pulses which imply three different light intensities but a constant shine-on time. It should be noted that the pulse duration time control is equivalent to the light intensity control since the relaxation time of the light emission mechanism applied to the lighting apparatus is longer than the repetition time (1/60 seconds) to take the frames.

Figure 3C:
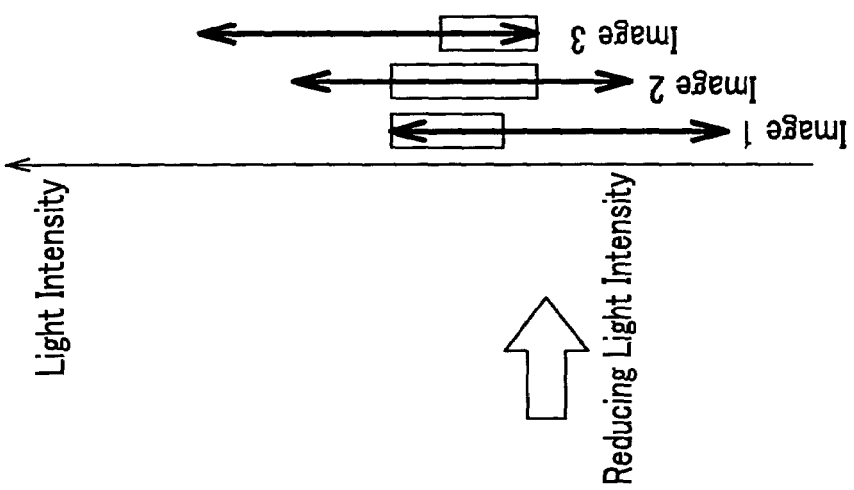
FIG. 3 is a schematic that explains the brightness of the objects and the intensity of the light shining the objects.
Figure 3B:
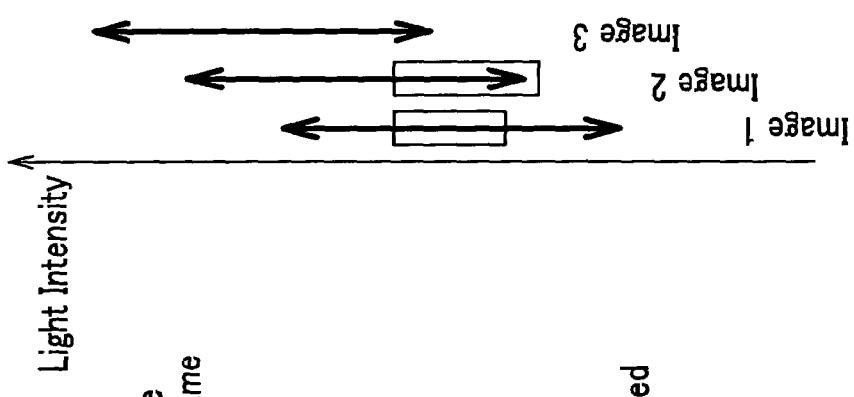
Figure 3A:
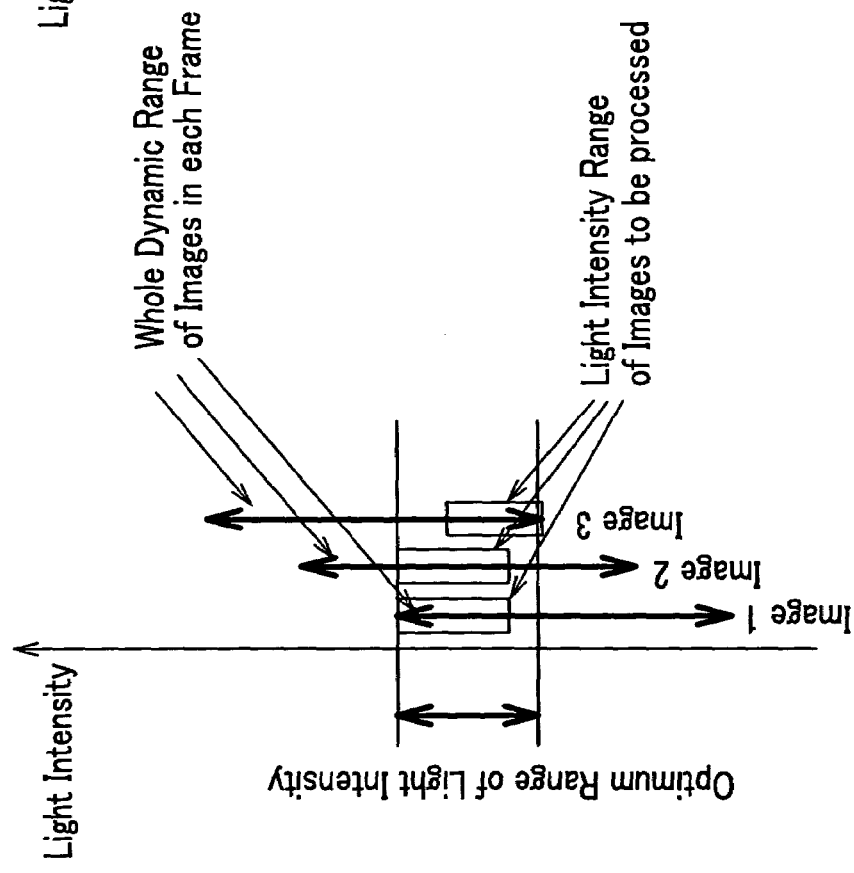

FIG. 3 shows the brightness of the objects in a frame of streaming image taken by the video cameras 3 wherein the objects are shined on with the light intensity of the lighting apparatus 5 controlled by the pattern data 1 and the pattern data 2. As shown in FIG. 3A, three kinds of object images, each shined on by different intensity of the lighting apparatus 5, are provided with different brightness as the image 1, the image 2 and the image 3. The optimum brightness of the objects is in a range usually narrower than the reflected lights from the natural objects which have a dynamic range from the darkness close to black bodies to the brightness close to complete reflection bodies.

The decoder 17 (17a, 17b, 17c, 17d) converts the analog video signals from the video cameras 3 (video camera 3a, 3b, 3c and 3d) into the video digital data of YCbCr and RGB. The output signal of the video digital data from the decoder 17 is sent to the multiplexer 19.

The multiplexer 19 selects the video digital signals from the decoders 17 in an order of the decoders and sends them to the LUT (Look Up Table) unit for color adjustment. The selection by the multiplexer 19 is done by each set of two stereo video camera sets as selecting the decoders 17c and 17d and then the decoders 17a and 17b. The data set is alternatively sent to the LUT unit 21.

The LUT unit 21 is to adjust the chrominance or luminance for image optimization.

The LUT memory 23 has a record of the conversion table for gamma correction and the color correction for such image optimization. The gamma correction is to linearize the image in a dynamic range of the luminance.

After image correction for chrominance or luminance, the memory controller 25 allocates the corrected digital image data into predetermined addresses to compose frames. For the transferring the image data, the memory controller receives the request signal from the main image processor unit 7 and then control the frame memory (built-in the memory controller 25) to directly output the image data onto the PCI bus in a frame configuration. The bus controller 33 is controlled by the memory controller 25 in the data transferring.

The frame transfer is carried out by the memory controller 25 in such a way that the controller sets a flag for each frame wherein the flag is memorized in the frame memory 27 and has a function to record the flag. The record of the flag can be embedded in the frame data.

The frame memory 27 can be constructed with the conventional RAMs of the synchronous dynamic RAMs. These RAMs are configured to be video RAMs that support the multi-bit output in response to the data band necessary for the in-frame images of the full-size frame data. The memory controller 25 controls the storage and retrieval of the images under such frame concept. The frame memory 27 has a capability to directly transfer the data to the main image processor unit 7 (not explicitly shown in FIG. 1).

In the embodiment of the present invention, the frame memory 27 further is configured to construct a ring buffer memory. The frame memory capacity is as large as the capacity necessary to store 90 frames. When new image data is input over than 90 frames, the oldest frame data is overwritten by the new image data. If the oldest frame data has a flag which the memory controller 25 has set, no overwrite is done to the oldest frame data and the data is maintained, which is called non-destructive overwrite or overlay. Therefore the flagged frame data is non-erasable before de-flagging. The ring buffering and flag management are actually carried out in the memory controller 25 to avoid the frequent memory data migration in the RAMs which takes time and causes large power consumption.

Figure 4B:
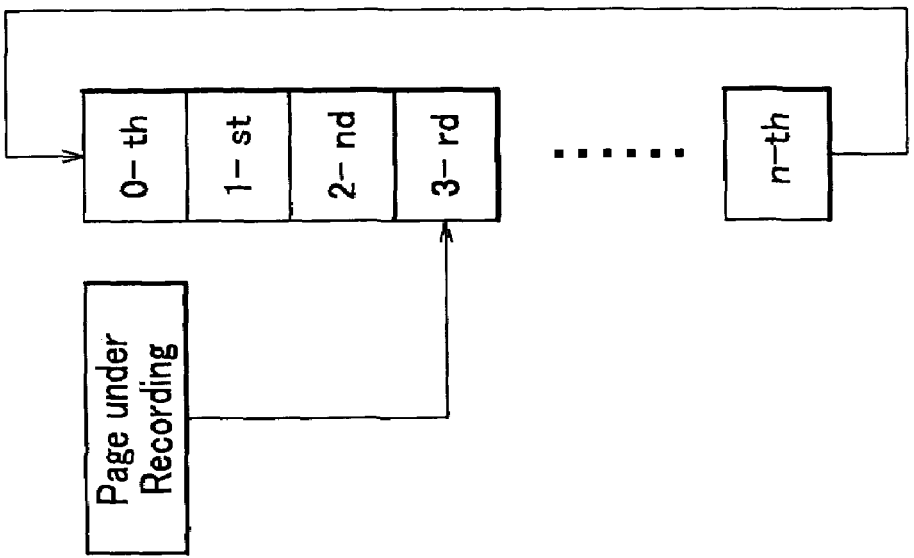
FIG. 4 is a schematic that shows the structure of the ring buffer memory.
Figure 4A:
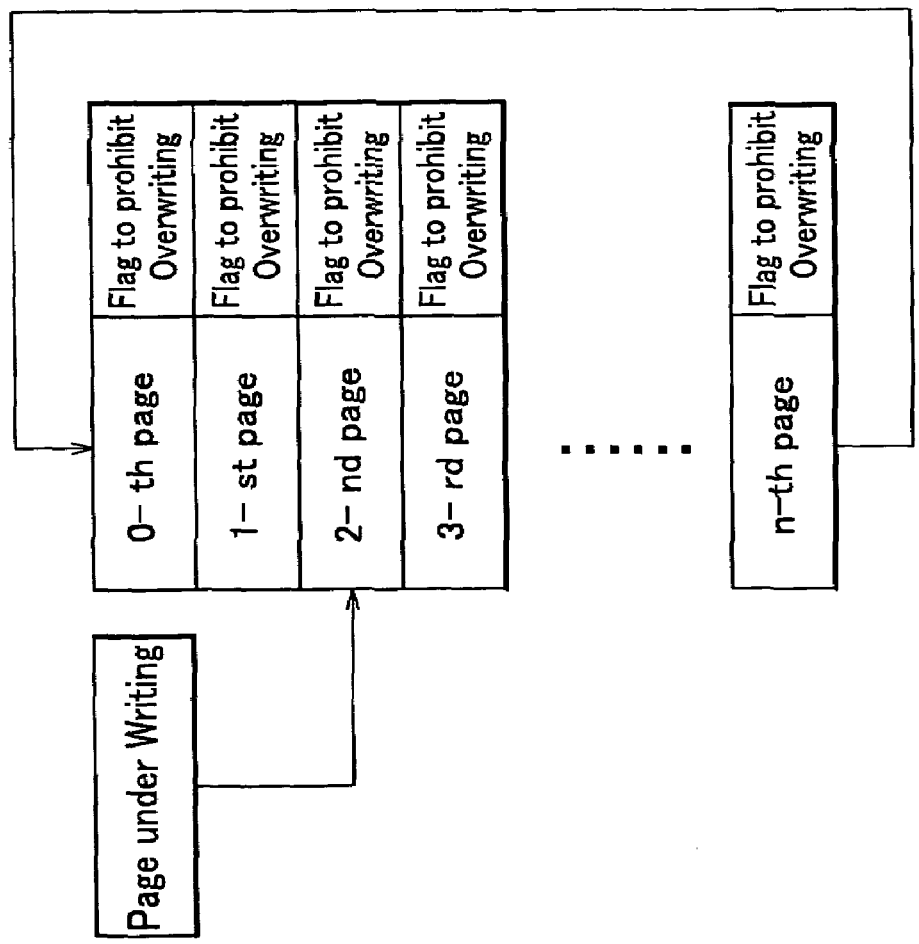

FIG. 4 shows the operation concept of the ring buffer memory. FIG. 4A shows the embodiment of the present invention that is the memory controller 25 has the page registers in which the frame number is written and controls the memory address which composes a frame in which the image data is stored. After the image data is written in such frame then the next frame number is written in the next page register. When all registers have been filled with the frame number then the next series frame numbers are overwritten from the 0-th page register. For the memories of which addresses are specified by the frame number, the image data are memorized. When the page register which has a flag "1" (which implies to prohibit overwriting), then new image data is not overwritten in the frame memory of which address is specified by the page register. The conventional ring buffer memory operation shown in FIG. 4B has a simple design such that the frame memory from 0-th to n-th is circularly overwritten since no flag records are implemented.

The retrieval of the frame data will be discussed in the following paragraphs. The raster line comparator 29 is to compare the raster line number of the in-frame image in the frame data with the number of the last raster line of the necessary raster image data of the transferred frame which is specified in the request signal sent by the main image processor unit 7. When the raster line comparator 29 detects the coincidence of these raster line numbers, the raster line comparator 29 sends an acknowledgement signal to the main image processor unit 7 through the PCI bus.

In case of transferring the entire frame of the frame data, it is possible to set a such data transferring system that the raster line comparator 29 does not send an acknowledgement signal to the main image processor unit 7. This may be used for the burst image data transfer.

The frame counter 31 counts the synchronous pulses generated by the pulse generator 15 and the count number is sent to the bus controller 33 and the time stamping code generator 35.

The bus controller 33 supports the synchronous transfer of the frame data as sending the frame data in synchronous to sending the count number wherein the frame data and the count number are sent to the main image processor unit 7 through the PCI bus. When the main image processor 7 requests to transfer the part of entire frame, the bus controller 33 adds a frame index that shows the count number. The index supports the block transfer of the frame data wherein each frame is identified with the count number.

The time stamping code generator 35 generates the time stamping code in stead of the count number and send the time stamping code to the controller unit 9A through a communication line (such as RS232C). The time stamping code is formatted in an appropriate format supported in the communication line.

By using the time stamping code which is converted into the counter signal by the counter signal generator 9a, it is possible to make the same time base to consolidate the image data and the other data (such as the controller signals of the motor (11A), provided the frame data has a frame index that shows the count number. Therefore the concurrency of the robot action with the acquired image can be realized.

Since the last raster line of the necessary raster image data of the transferred frame can be specified in the request signal sent from the main image processor unit 7, the raster line comparator 29 determines the last raster line of the frame data. It is possible that the main image processor unit 7 can obtain the frame data which are in the size of the necessary data. Therefore the main image processor unit 7 can start the image processing as soon as receiving the necessary data that corresponds the part of the in-frame image that is to be processed. This realizes the timely image processing since the conventional DMA frame data transfer occupies the data transfer time until the transferring the entire frame data. Therefore the main image processor unit 7 can have a longer time to fully work for the image processing than the conventional frame grabber system.

The frame data in the frame memory 27 is controlled by a ring buffer. The frame memory 27 has a large memory capacity to store 90 pieces of frame. The ring buffer has a capability to hold the memory not to be overwritten by using flags, which can protect the data that have not been transferred to the main image processor unit 7 which is engaged with a heavy processing. These features of the present invention support the continuous frame data transfer from the frame grabber without data missing. This overwrite protection supports the prioritization of the acquired data so that the real-time operation capability is realized.

The various pattern data for shining the objects by the lighting apparatus 5 are memorized in the memory means attached to the pulse generator 15. The use of these pattern data in order to control the intensity of the lighting apparatus 5 provides the various conditions of light to shine the objects. Therefore, the high reflection on the objects can be easily extracted since the highly reflected lights are detected by the saturation range of CCDs used for the light sensors or the video cameras 3. If the bright areas on the images are constantly reveals regardless to the intensity of the light, it is concluded that the bright areas are highly reflective portion of the objects.

(Operational Flow of the Frame Grabber)

Figure 5:
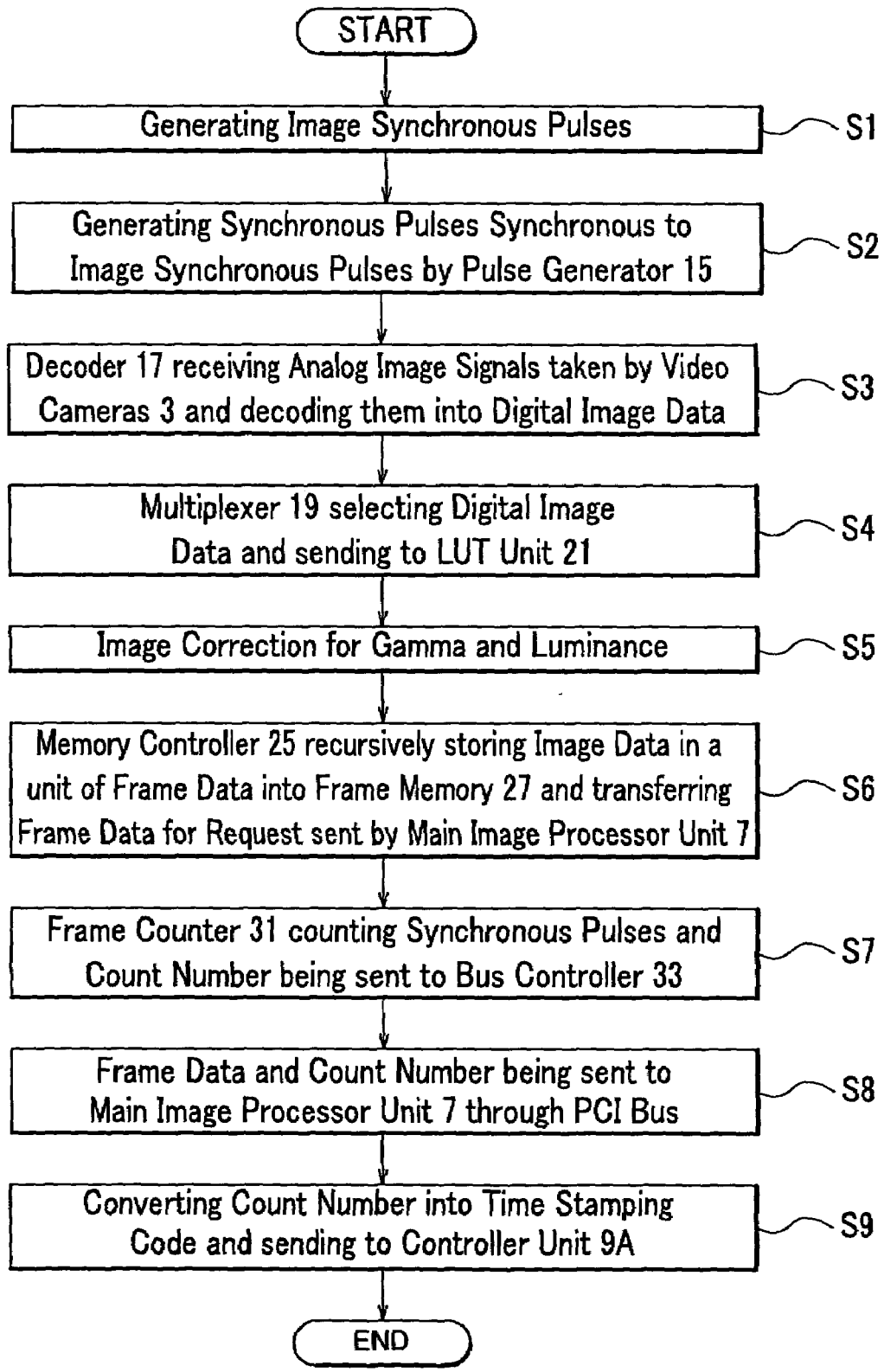
FIG. 5 is a schematic that shows an overall operation flow of the frame grabber regarding the present invention.

FIG. 5 shows the flow of the entire operation of the frame grabber. The purpose of the simplicity, the flow is depicted for the case that image data acquisition by the video cameras 3 to frame data transfer to the main image processor unit 7 is kept in a straight flow and asynchronous features realized with the independent data acquisition function and the independent frame data transfer function does not happen.

The image synchronous signal generator 13 generates the image synchronous pulses which are sent to the video cameras 3 (as 3a, 3b, 3c and 3d) for the used of vertical synchronous signals (S1).

The synchronous pulses (shutter pulses and light control pulses) are generated. The light control pulses are sent to the lighting apparatus 5 in synchronous to the shutter pulses being sent to the video cameras 3 (as 3a, 3b, 3c and 3d). Then the video cameras 3 take the images of the objects and the analog image signals are input to the frame grabber 1.

The decoder 17 of the frame grabber 1 receives the analog image signals and decodes (as A/D conversion) the signals into digital image data and sends the resultant decoded signals to the multiplexer 19 (S3). The multiplexer 19 selects the digital image data so that the multiplexer 19 selects a pair of the digital image signals from the decoder 17c and 17d or the other pair of the digital image signals from the decoder 17a and 17b (S4).

The selected digital image signals by the multiplexer 19 LUT unit 21 carry out the image correction for chrominance, gamma or luminance (S5) The memory controller 25 recursively stores the image data in a unit of a frame data into the frame memory 27 and transfers the frame data in response to the request sent from the main image processor unit 7 (S6).

The frame counter 31 counts the synchronous pulses generated by the pulse generator 15 and the count number is sent to the bus controller 33 (S7). The bus controller 33 supports the synchronous transfer of the frame data as sending the frame data in synchronous to sending the count number wherein the frame data and the count number are sent to the main image processor unit 7 through the PCI bus (S8). The frame counter 31 sends the count number to the time stamping code generator 35 which converts the count number into the time stamping code and sends the time stamping code to the controller unit 9A (S9). The synchronous pulse generated by the pulse generator 15 is transferred to another controller unit 9B.

(Frame Grabber Operation for Transferring Frame Data)

Figure 6:
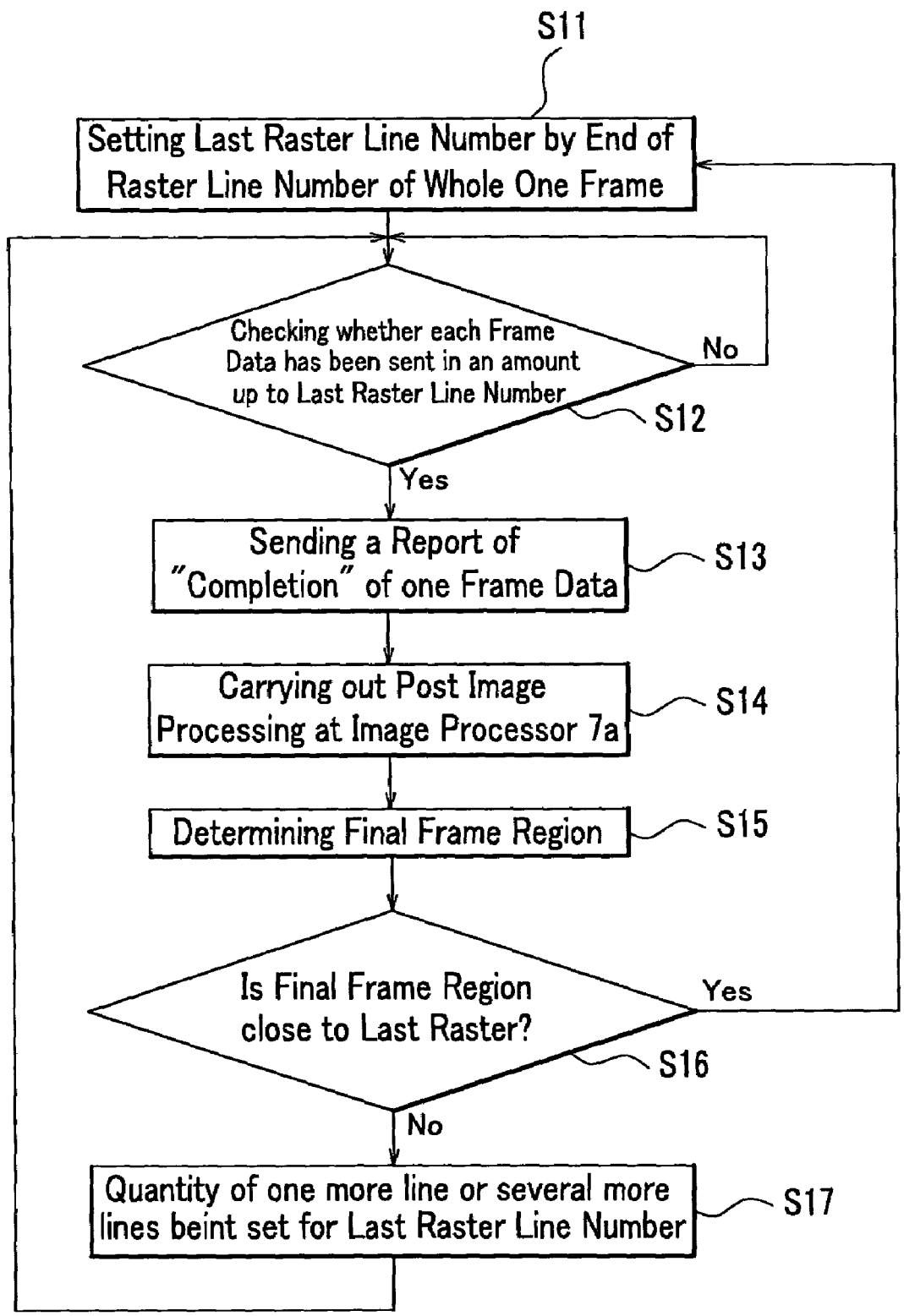
FIG. 6 is a schematic that shows an operation flow in the data transferring of the image that is specified of the necessary size to be processed by the image wherein a line comparator is used.

The transfer operation of the frame data from the frame grabber is discussed with the flow chart shown by FIG. 6a and by the reference of FIGS. 7 and 8.

The raster line comparator 29 installed in the frame grabber 1 keeps a default of the last raster line number as the end of the raster line number of the whole of one frame on the in-frame image in the full-size frame data at the initial time (S11). Once the main image processor unit 7 sends a specific last raster line number to the raster line comparator 29 through memory controller 25, then the raster line comparator 29 keeps checking whether each frame data has been sent in an amount of the necessary in-frame image up to the raster line number as specified by the last raster line number. The checking is always carried out during a whole frame data transferring to the main image processor (S12). When the raster line comparator 29 judges the transferred frame data has achieved up to the last raster line number, then the next frame data is ready to be transferred to the main image processor unit 7. At the completion of frame data transferring up to the last raster line number, the memory controller 25 sends a report of "Completion" of one frame data to the main image processor unit 7 (S13). It depends on the mode of frame data transferring, as that of burst transferring, block transferring or frame transferring, whether the next frame data is sequentially sent to the main image processor unit 7 or is waited until the request raised by the main image processor unit 7. The memory controller 27 and the frame memory 27 are still acquiring the image data during this frame data transferring operation.

Figure 7A:
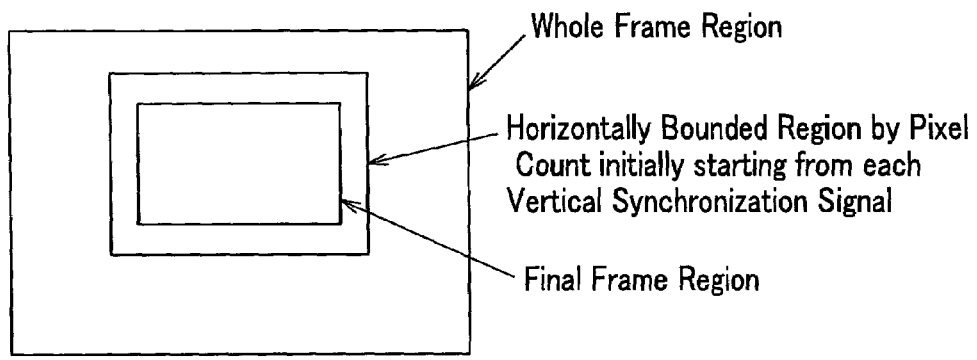
FIG. 7 is a schematic that shows the region in the frame of the acquired image to be sent to a main image processor.
Figure 7B:
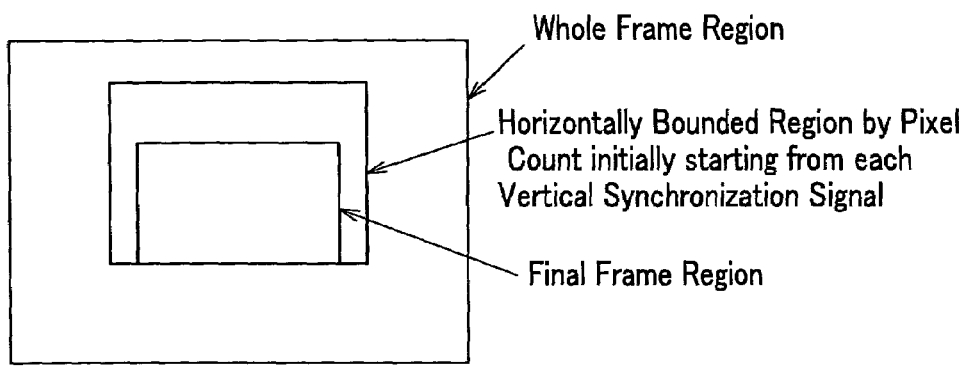

When the main image processor unit 7 receives the report of "Completion" of one frame data, then the main image processor unit 7 carries out the image processing of the in-frame image at the image processor 7a (S14). The final frame region is determined (S15) for the use in the application which is, for example, a robot system in the present invention. In this determination the horizontal region is determined by using a raster data that is divided into the horizontal pixel count initially starting from each vertical synchronization signal. Next to such determination, it is judged, as shown in FIG. 7A and FIG. 7B, whether the last raster of the final frame region is within the last raster line of the transferred frame data as specified by the last raster line number. If the last raster number of the final frame region is smaller than or equal to the number last raster line of the transferred framed data ("Yes" in S16), then the next frame data transfer operation repeats with the same last raster line number as given before. If the last raster number of the final frame region is larger than the number last raster line of the transferred framed data ("No" in S16), then the last raster number of the final frame region is set to be increased by a quantity of one more line or several more lines within in the limit of the raster line number of the whole of one frame on the in-frame image in the frame data (S17) and the step goes back to frame data transferring step as denoted by S12. The frame data transfer operation repeats with the last raster line number larger than before.

Figure 8A:
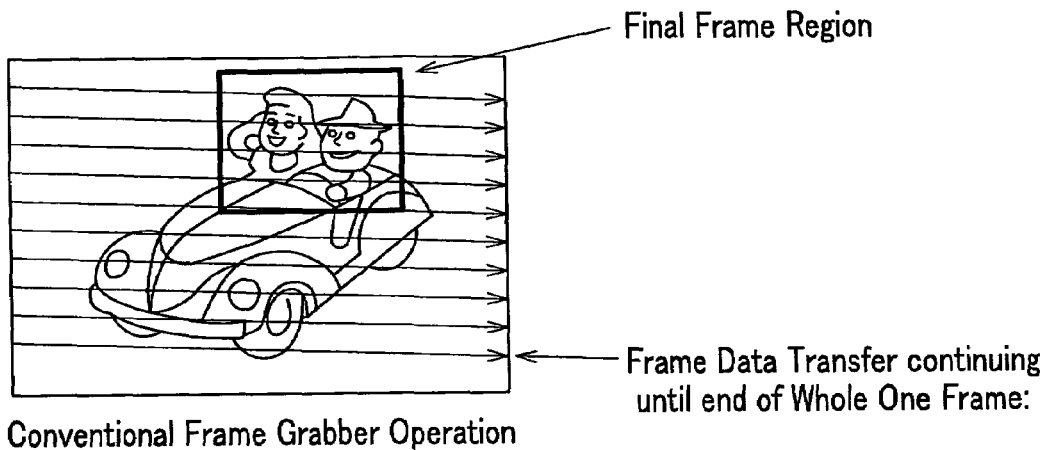
FIG. 8 is a schematic that explains the frame data to be transferred and the final frame region to be handled by the main image processor.
Figure 8B:
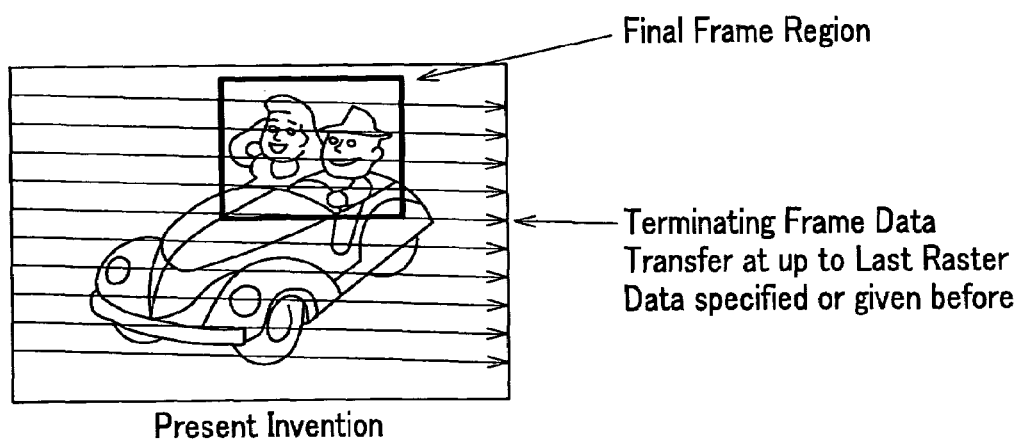

For the conventional frame grabber operation, the frame data transfer continues until completely transferring image data of whole one frame as shown in FIG. 8A. Therefore the main image processor unit 7 is engaged in the frame data receiving until such data completion, which is time consuming against the image data amount necessary for the final frame region. However, the present invention can terminate the frame data transfer at the last raster data up to the raster line number as specified or set before as shown in FIG. 8B. Therefore the main image processor unit can function for the dedicated image processing released from data transfer operation which is consumed for such unnecessary data further from the last raster data.

The embodiment of the present invention has been explained, however it will be understood by person skilled in the art that variations and modifications may be made thereto without departing from the scope of the invention, which is indicated by the above embodiment and the appended claims. For example, the pulse signal generated by the pulse generator 15 is converted in to the time stamping code at the time stamping code generator 35, however the pulse signal can be used as a synchronous signal to be sent to the controller unit 9A as far as the absolute time is commonly used for the controller unit 9A and the main image processor unit 7 or a common time base is for both units.

What is claimed is:

1. A frame grabber which has a function to output digital image data sourced from analog image signals taken by video cameras to a main image processor unit and a function to make same time base to consolidate said image data with other data to be used for a controller unit under association with said digital image data comprising,
   a pulse generator to generate pulses in synchronous to image synchronous pulses to be output to said video cameras;
   a pulse counter to count said pulses generated by said pulse generator;
   an image data transfer means that has a function to transfer said digital image data in synchronous to sending count numbers obtained as a result of counting said pulses to said controller unit; and
   a synchronous signal transmitter to send said count number to said controller unit.

2. A frame grabber according to claim 1, wherein said image data transfer means includes
   a frame memory that is configured to store in-frame image in a unit of frame data and has a capacity to store at least an amount of in-frame image data corresponding to two full-size frames;
   a raster line comparator that keeps checking whether each frame data has been sent in an amount of necessary in-frame image up to a raster line number thereof given by said main image processor unit; and
   a memory controller that sends a report of "Completion" of said each frame data to said main image processor unit.

3. A frame grabber according to claim 1, wherein said image data transfer means includes a memory controller that has a function to manage a flag attached to each in-frame image data that is stored in a unit of frame data configured in a frame memory by said memory controller where said flag indicates to accept or prohibit a memory region to be allocated for new frame data to overwrite existing frame data.

4. A frame grabber that further has a lighting apparatus in addition to said frame grabber according to claim 1, wherein said pulse generator includes a memory means to store plural data to control said lighting apparatus to shine objects of which image is acquired by said frame grabber by means of at least any one of variations as time delay-against pulses generated by said pulse generator, pulse duration time and pulse height.

* * * * *